July 10, 1962  T. F. JOHNSON  3,043,924
SPRING MOTOR MECHANISM FOR FAST AUTOMATIC OPENING
OR CLOSING OF HIGH TENSION ELECTRIC SWITCHES
Filed March 8, 1961  3 Sheets-Sheet 1
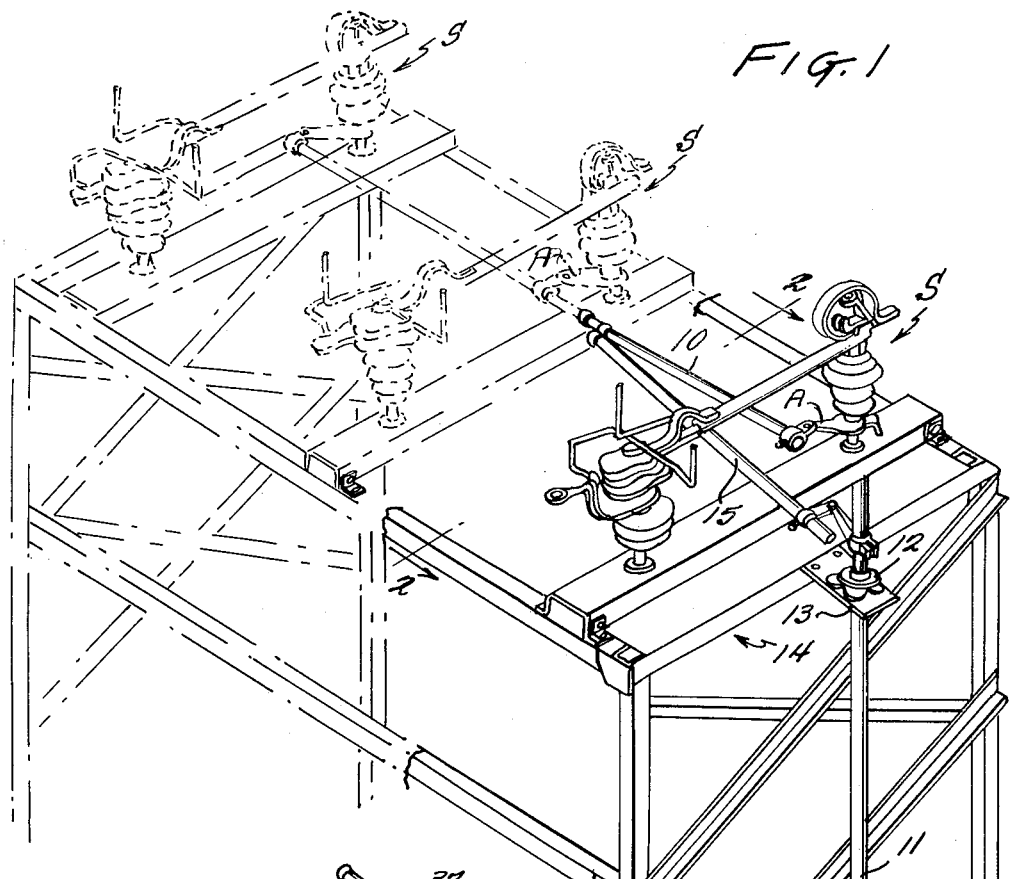
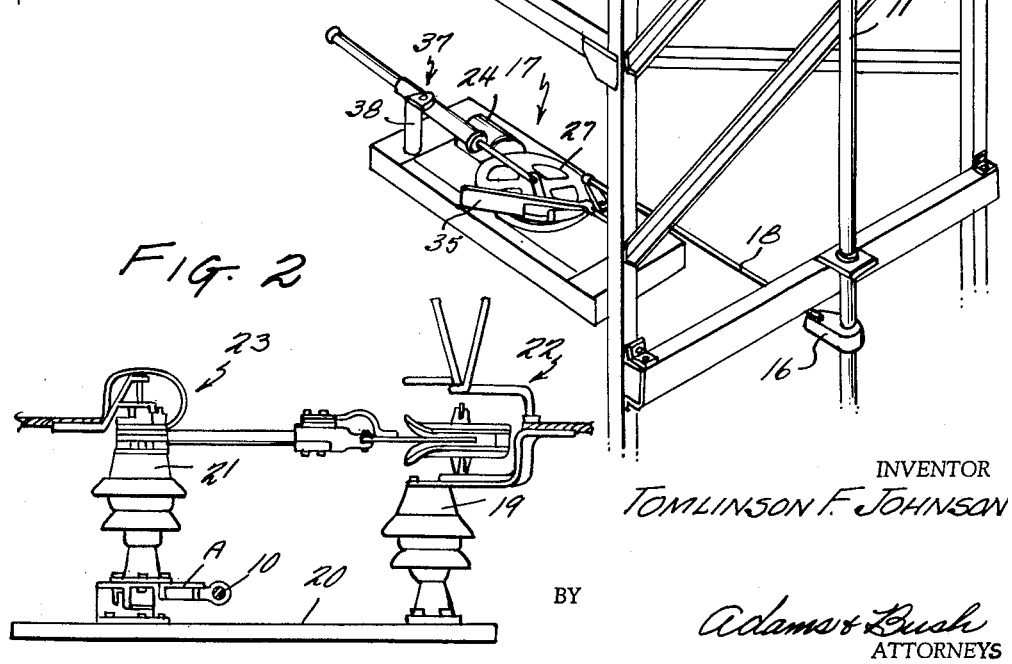
INVENTOR
TOMLINSON F. JOHNSON
BY
*Adams & Bush*
ATTORNEYS

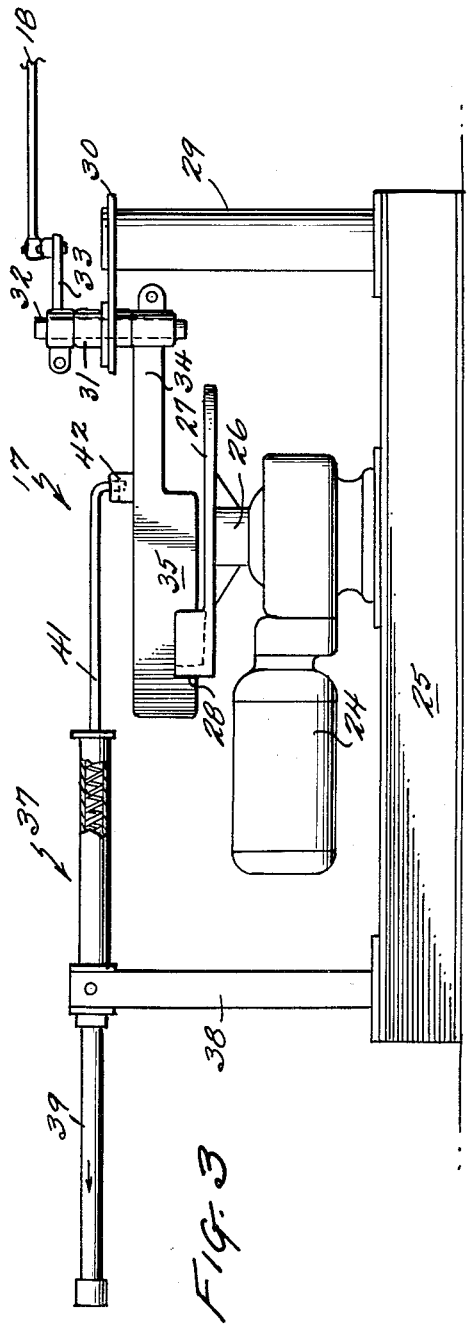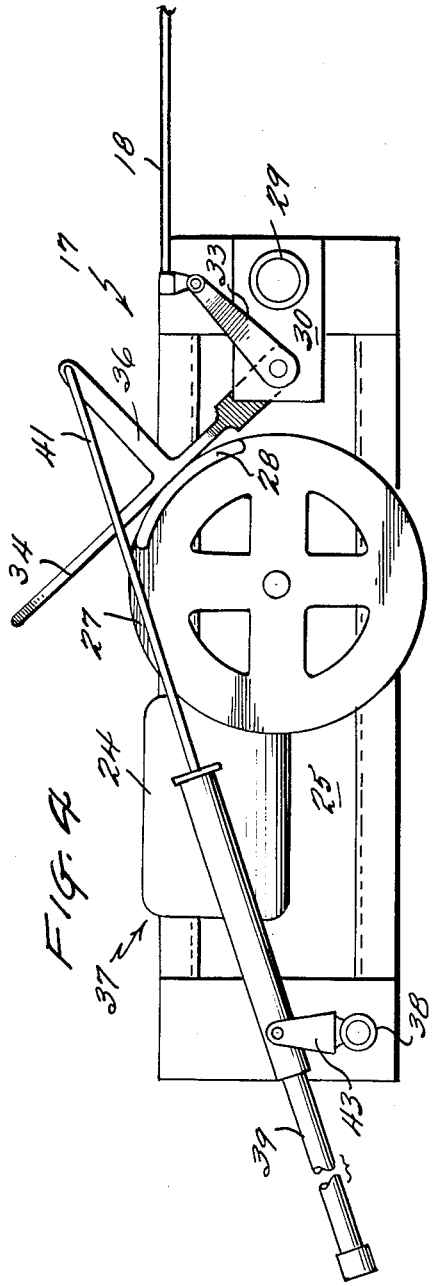

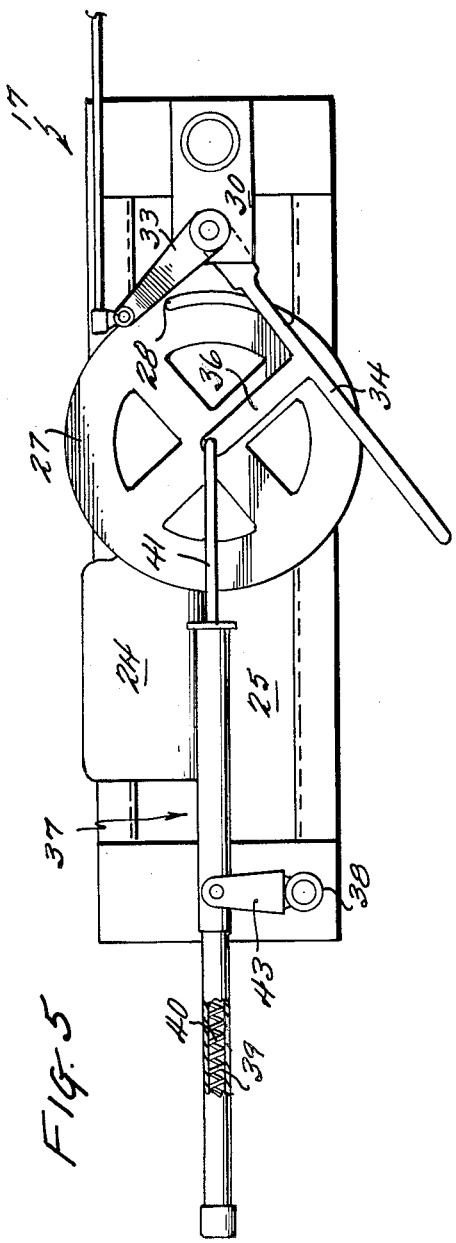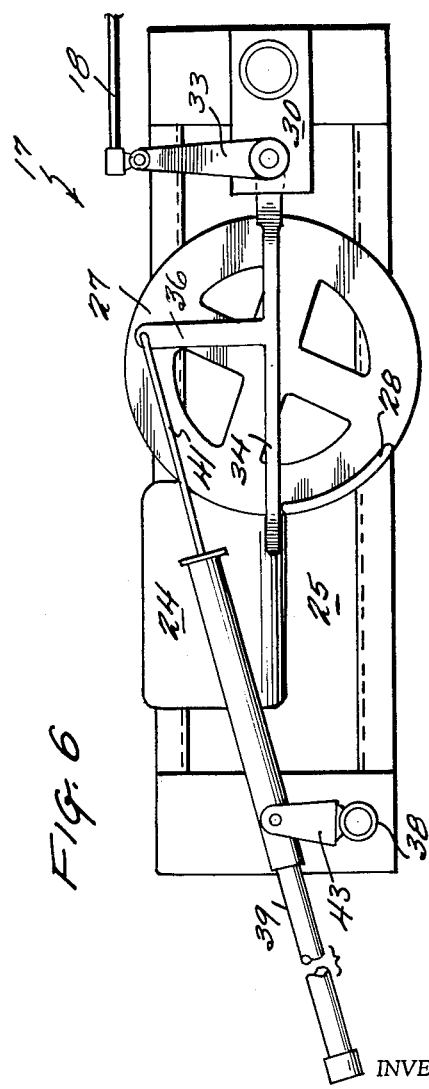

United States Patent Office 3,043,924
Patented July 10, 1962

3,043,924
SPRING MOTOR MECHANISM FOR FAST AUTOMATIC OPENING OR CLOSING OF HIGH TENSION ELECTRIC SWITCHES
Tomlinson F. Johnson, P.O. Box 10958, Atlanta, Ga.
Filed Mar. 8, 1961, Ser. No. 94,307
6 Claims. (Cl. 200—48)

This invention relates to high tension electric switches and has more particular reference to apparatus for opening and closing gang operated high tension electric switches.

One object of the present invention is to provide novel and improved apparatus for opening and closing gang operated high tension electric switches.

Another object of the present invention is to provide novel and improved apparatus, as characterized above, including spring means for fast automatically moving the switches in one direction and electrically operated means for controlling the operation of the spring means and for moving the switches in the other direction, and locking means for holding the switches in the position to which they have been moved.

A further object of the invention is to provide apparatus for opening and closing gang high tension electric switches which is simple and inexpensive in construction and efficient in carrying out the purpose for which it is designated.

Other objects and advantages of the invention will appear in the following specification when considered in connection with the accompanying drawings, wherein:

FIG. 1 is a perspective view, with parts broken away, of a gang of high tension electric switches and showing them connected to one embodiment of apparatus for opening and closing the switches and holding them in their opened or closed position, constructed in accordance with the present invention;

FIG. 2 is a vertical sectional view, taken on the line 2—2 of FIG. 1, showing the construction of a switch unit;

FIG. 3 is a side elevational view showing the apparatus for opening and closing the switches and holding them in their opened or closed position, and the manner in which it is connected to rotate the vertical switch operating shaft for the gang of switches;

FIG. 4 is a plan view of the apparatus shown in FIG. 3, showing the position of the apparatus when the switches are open;

FIG. 5 is a view similar to that shown in FIG. 4, but showing the position of the apparatus when the switches are closed; and FIG. 6 is a view similar to that shown in FIG. 4, but showing the apparatus in the process of reopening the switches.

The present invention is an improvement on the invention shown and described in my co-pending application Ser. No. 42,704, filed July 13, 1960, now Patent No. 3,026,388, March 20, 1962, for Mechanism for Opening or Closing a Switch by Means of an Electric Motor, and provides novel and improved apparatus for operating high tension electric switches of the movable insulator type wherein a stationary insulator carrying switch jaws and a movable insulator carrying a switch blade are mounted on a common support. The invention provides novel and improved means for fast and automatically moving the switches to either opened or closed position and holding them in the position to which they have been moved.

The improved apparatus is particularly designed for operating groups or gangs of such high tension electric switches.

While the improved apparatus, for operating a gang of high tension electric switches, of the present invention, can be used with high tension electric switches of either the vertical break rotating type switch, such as disclosed in my prior Patent No. 2,248,876, the side break rotating type such as disclosed in my prior Patent No. 2,231,809, or the rocking insulator type such as disclosed in my Patent No. 2,794,871; for the purpose of illustration, it will be shown and described as used with a high tension side break rotating switch of the type shown in FIG. 6 of my Patent No. 2,231,809.

Referring now to the drawings, there is illustrated, in FIGS. 1 to 4, inclusive, a gang or group of side break rotating insulator type switch units connected to one embodiment of apparatus constructed in accordance with the present invention for operating the switch units as a group to move them to closed or opened position and to hold them in the position to which they have been moved. As there shown, the apparatus comprises a gang or group of switch units S, three such being shown, each having the operating arm A of its rotating insulator pivotally connected to an interphase rod or pipe 10; a vertical rotatable operating shaft or down pipe 11 journaled in suitable bearings 12 carried by brackets 13 mounted on the frame, indicated generally at 14, which supports the switch units S; a reach pipe 15 pivotally connected at one end to the interphase pipe 10 and having its other end pivotally connected to the down pipe 11; an operating arm 16 fixedly secured on the bottom end portion of the down pipe 11; and a spring and motor mechanism, indicated generally at 17, connected by a connecting rod 18 to the operating arm 16 to rotate the down pipe 11.

The switch units S are generally similar to the switch unit shown in FIG. 6 of my prior Patent No. 2,231,809, and, as shown in FIG. 2, each comprises a stationary insulator 19, fixedly mounted on one end of an ordinary structural channel member forming the base member 20 of the switch unit, and a rotating insulator 21 mounted on the other end of the base member. The stationary insulator 19 carries the usual switch jaws and terminal connections, indicated generally at 22, and the rotating insulator 21 carries the usual switch blade assembly and terminal connections, indicated generally at 23.

The operating rod 10 is pivotally connected to the usual operating arm A of each of the rotating insulators for rotating these arms simultaneously as a unit to simultaneously open or close all of the switches.

The spring and motor mechanism, indicated generally at 17, is shown as comprising an electric motor and a connected reduction gearing 24 mounted on a base member 25. The gear motor 24 may be of any suitable commercial type of a combined electric motor and reduction gearing. The reduction gearing is connected to rotate a vertical shaft 26 on which is fixedly mounted a cam member in the form of a horizontal disc 27. The flat upper surface of the disc 27 has a short upstanding arc-shaped peripheral flange 28 formed thereon. A vertical rod 29 mounted on the base member 25 has a laterally projecting arm 30 secured on its upper end which supports a bearing 31 in which is rotatably mounted a stub shaft 32. An upper arm 33 and a lower arm 34 are fixedly connected to the stub shaft 32 for rotation therewith. The arms 33 and 34 are set to extend out from the stub shaft 32 at a predetermined angle from each other and, as shown, this angle is approximately 90°. The outer end of the upper arm 33 is pivotally connected to one end of the connecting rod 18, the other end of the connecting rod 18 being pivotally connected to the outer end of the operating arm 16 on the down pipe 11. The upper arm 33 is designed to rotate through approximately 90°, in order to rotate the operating arm 16 through approximately 90°, which rotative movement moves the switches from closed position to open position or from open position to closed position, depending upon the direction of rotation of the arm 16.

The lower arm 34 acts as a cam follower and is positioned above the cam disc 27, but has a depending blade 35 on its free end and projecting downwardly from the arm 34 in position to engage the upstanding flange 28 on the upper surface of the disc 27. The lower arm 34 also has an extension arm 36 formed thereon and projecting laterally therefrom substantially in parallelism with the upper arm 33. A spring bias member 37 pivotally mounted on an upright rod 38 mounted on the base member 25 is pivotally connected to the extension arm 36 and tends to pull the arm 36 to the position shown in FIG. 5. The spring bias member 37 may be of any suitable construction and is shown as comprising a hollow tube 39 having a heavy duty coiled spring 40 mounted therein. The inner end of the spring 40 is fixedly attached to the tube 39 and its outer end is connected to a hook 41 connected in an eyelet 42 on the extension arm 36. The hollow tube 39 is pivotally connected to a laterally extending arm 43 carried by the upright rod 38.

The down pipe 11, the reach pipe 15, and the interphase pipe 10 are so connected that the down pipe 11 must be rotated through 90° to move the switches from closed to open position or from open to closed position. Also, as hereinbefore pointed out, the upper arm 33 is mounted on the stub shaft and so connected to the operating arm 16 on the down pipe 11 that the upper arm 33 rotates through approximately 90° in order to move the arm 16 through 90°.

The heavy duty spring 40 in the spring biased member 27 performs the fast closing or opening of the switches, whether the spring biased member closes or opens the switches, depending upon the manner in which the apparatus 17 is connected to the operating arm 16 and the way in which the arm 16 is mounted on the down pipe 11. The gear motor 24 and cam member 27 act as a tripping and resetting device for the spring biased member 37.

The starting and stopping of the gear motor 24 are controlled by an operator by means of a suitable usual switch panel (not shown) located in a remote control station.

From the foregoing the operation of the apparatus is believed apparent. Assuming the apparatus is connected to effect the fast automatic opening action by the heavy duty spring 40 with the switches closed, as shown in FIGS. 1 and 4, the motor 24 is stopped, the dependent blade 35 carried by the cam follower arm 34 is held against the arc-shaped flange 28 on the disc 27 by the pull of the spring 40 in the spring biased member 37, thereby holding or locking the switches in closed position. In this position, the gear motor 24 is ready to trigger the action of the heavy duty spring 40 to open the switches by rotating the cam member 27 clockwise, as viewed in FIG. 4, so that the flange 28 will be moved out of engagement with the blade 35 of the cam follower arm 34. When this happens the heavy duty spring acts fast to automatically open the switches by moving the cam follower arm 34 to the position shown in FIG. 5. In this position, the switches are open and locked or held in their open position by the pull of the heavy spring 40.

The operator resets the trigger action of the cam disc 27 and closes the switches by causing the motor to rotate the cam disc 27 clockwise, as viewed in FIG. 6, to bring the leading end of the arc-shaped flange 28 into engagement with the blade 35 and thereby move the cam follower blade to the position shown in FIG. 4, in which position the switches are closed and the apparatus is ready to be triggered for another fast opening of the switches.

From the foregoing description, it readily will be seen that there has been provided novel and improved electrically operated apparatus for opening and locking open and closing and locking closed, as a unit, a gang of high tension electric switches, apparatus which is simple in construction, inexpensive, and efficient in operation.

While the apparatus has been illustrated and described as operating a triple pole switch made up of three high tension switch units of the rotating insulator type, obviously, it could just as readily be employed to operate double pole or single pole switches of the rotating or rocking insulator type.

Obviously, too, the invention is not restricted to the particular embodiment thereof herein shown and described.

What is claimed is:

1. Apparatus for operating a group of high tension electric switches of the movable insulator type comprising a horizontal rod connected to the movable insulator of each of said switches for turning the movable insulators as a unit to simultaneously open and close all of the switches; a vertical rotatable shaft having its upper end connected to operate said horizontal rod to move said switches to and from their open and closed positions and having a laterally projecting operating arm fixedly secured thereon intermediate its ends; and means for moving said operating arm to the position in which said switches are closed and to the position in which said switches are open including a rotatable cam follower arm connected to actuate said operating arm; spring biased means for rotating said cam follower arm in one direction and locking the switch in the position to which it has last been moved; a rotatable cam member for engaging said cam follower arm and rotating it in the opposite direction; said rotatable cam member being in the form of a disc mounted for rotation about a vertical axis and having a peripheral arc-shaped upstanding flange on its upper surface, said cam follower arm being mounted for rotation about a vertical axis offset from the vertical axis of said cam member and carrying a dependent blade on its outer free end adapted to move into and out of engagement with said arc-shaped flange as said cam member is rotated; and an electric motor connected to rotate said cam member.

2. Apparatus as set forth in claim 1, wherein said spring biased means comprises a coiled spring mounted to normally resiliently hold the dependent blade on the outer end of said cam follower arm pressed against the arc-shaped flange on said cam member when said switches have been moved to one of their said positions and to fast and automatically move said switches to their other position when said cam member is rotated to move said arc-shaped flange out of engagement with the depending cam follower blade.

3. Apparatus as set forth in claim 2, wherein said cam follower arm is secured on a stub shaft mounted for rotation about a vertical axis; a second arm mounted on said stub shaft and extending therefrom at approximately 90° from said cam follower arm; and a link pivotally connected at one end to the end of said second arm and pivotally connected at its other end to said operating arm on said down pipe, the construction and arrangement being such that said cam follower arm rotates through approximately 90° in order to rotate said operating arm through approximately 90°.

4. Apparatus for operating a high tension electric switch of the movable insulator type comprising a vertical rotatable shaft having its upper end connected to turn the movable insulator to move said switch to and from its open and closed positions and having a laterally projecting operating arm fixedly secured thereon intermediate its ends; and means for moving said operating arm to the position in which said switch is closed and to the position in which said switch is open including a rotatable cam follower arm connected to actuate said operating arm, spring biased means for rotating said cam follower arm in one direction and locking the switch in the position in which it has last been moved; a rotatable cam member for engaging said cam follower arm and rotating it in the opposite direction; said rotatable cam member being in the form of a disc mounted for rotation about a vertical axis and having a peripheral arc-shaped upstanding flange on its upper surface, said cam follower arm being mounted for rotation about a vertical axis offset from the vertical axis of said cam member and carrying a dependent blade on its outer free end adapted to move into and out of engagement with said arc-shaped flange as said cam member is rotated; and an electric motor connected to rotate said cam member.

5. Apparatus as set forth in claim 4, wherein said spring biased means comprises a coiled spring mounted to normally resiliently hold the dependent blade on the outer end of said cam follower arm pressed against the arc-shaped flange on said cam member when said switch has been moved to one of its said positions and to fast and automatically move said switch to its other position when said cam member is rotated to move said arc-shaped flange out of engagement with the depending cam follower blade.

6. Apparatus as set forth in claim 4, wherein said cam follower arm is secured on a stub shaft mounted for rotation about a vertical axis; a second arm mounted on said stub shaft and extending therefrom at approximately 90° from said cam follower arm; and a link pivotally connected at one end to the end of said second arm and pivotally connected at its other end to said operating arm on said down pipe, the construction and arrangement being such that said cam follower arm rotates through approximately 90° in order to rotate said operating arm through approximately 90°.

References Cited in the file of this patent
UNITED STATES PATENTS

| | | |
|---|---|---|
| 2,156,072 | Thumin | Apr. 25, 1939 |
| 2,669,622 | Owens | Feb. 16, 1954 |